US008182913B2

(12) United States Patent
Chun et al.

(10) Patent No.: US 8,182,913 B2
(45) Date of Patent: May 22, 2012

(54) BI-LAYER STRUCTURED SHEET HAVING EXCELLENT PRINTABILITY WHEN PRINTED BY HARD ROLL AND METHOD FOR PRODUCING THE SAME

(75) Inventors: Sang Ki Chun, Daejeon (KR); Dong Wook Lee, Daejeon (KR); In Seok Hwang, Daejeon (KR); Seung Wook Kim, Incheon (KR); Dong Han Kho, Daegu (KR)

(73) Assignee: LG Chem, Ltd., Seoul (KR)

( * ) Notice: Subject to any disclaimer, the term of this patent is extended or adjusted under 35 U.S.C. 154(b) by 469 days.

(21) Appl. No.: 12/225,816

(22) PCT Filed: Oct. 18, 2007

(86) PCT No.: PCT/KR2007/005111

§ 371 (c)(1), (2), (4) Date: Sep. 30, 2008

(87) PCT Pub. No.: WO2008/048058

PCT Pub. Date: Apr. 24, 2008

(65) Prior Publication Data

US 2009/0176109 A1 Jul. 9, 2009

(30) Foreign Application Priority Data

Oct. 20, 2006 (KR) ........................ 10-2006-0102130

(51) Int. Cl.
*B32B 27/08* (2006.01)
*B05D 3/14* (2006.01)

(52) U.S. Cl. ........ 428/332; 427/379; 427/402; 427/533; 427/534; 427/535; 428/421; 428/422; 428/450; 428/451; 428/334; 428/335; 428/336; 428/412

(58) Field of Classification Search .................. 427/379, 427/402, 533, 534, 535; 428/412, 421, 422, 428/450, 451

See application file for complete search history.

(56) References Cited

U.S. PATENT DOCUMENTS

| | | | | |
|---|---|---|---|---|
| 5,223,344 | A * | 6/1993 | Sumpter et al. | 428/447 |
| 5,417,164 | A | 5/1995 | Nishida et al. | |
| 5,494,884 | A | 2/1996 | Kobayashi et al. | |
| 5,840,421 | A | 11/1998 | Kobayashi et al. | |
| 5,888,625 | A | 3/1999 | Kobayashi | |
| 5,992,320 | A | 11/1999 | Kosaka et al. | |
| 6,740,418 | B2 * | 5/2004 | Lewis et al. | 428/447 |
| 2005/0282959 | A1 * | 12/2005 | Ahn et al. | 524/861 |

FOREIGN PATENT DOCUMENTS

| | | | |
|---|---|---|---|
| JP | 08-321258 | | 12/1996 |
| JP | 09-204060 | A | 8/1997 |
| JP | 10-144207 | A | 5/1998 |
| JP | 11-174174 | A | 7/1999 |
| JP | 2001-021706 | A | 1/2001 |
| JP | 2006-176267 | A | 7/2006 |

* cited by examiner

*Primary Examiner* — D. S. Nakarani

(74) *Attorney, Agent, or Firm* — McKenna Long & Aldridge LLP

(57) ABSTRACT

There are provided a sheet having a silicon/plastic bi-layer structure capable of easily transferring a paste even when a hard roll is used, the hard roll having excellent durability but having disadvantages that the paste is poorly transferred when the paste is printed on a plastic base, and a method for producing the same. The bi-layer structured sheet having excellent printability when printed by hard roll includes a flexible substrate and a silicon resin formed on the substrate.

18 Claims, 2 Drawing Sheets

[Fig. 1]
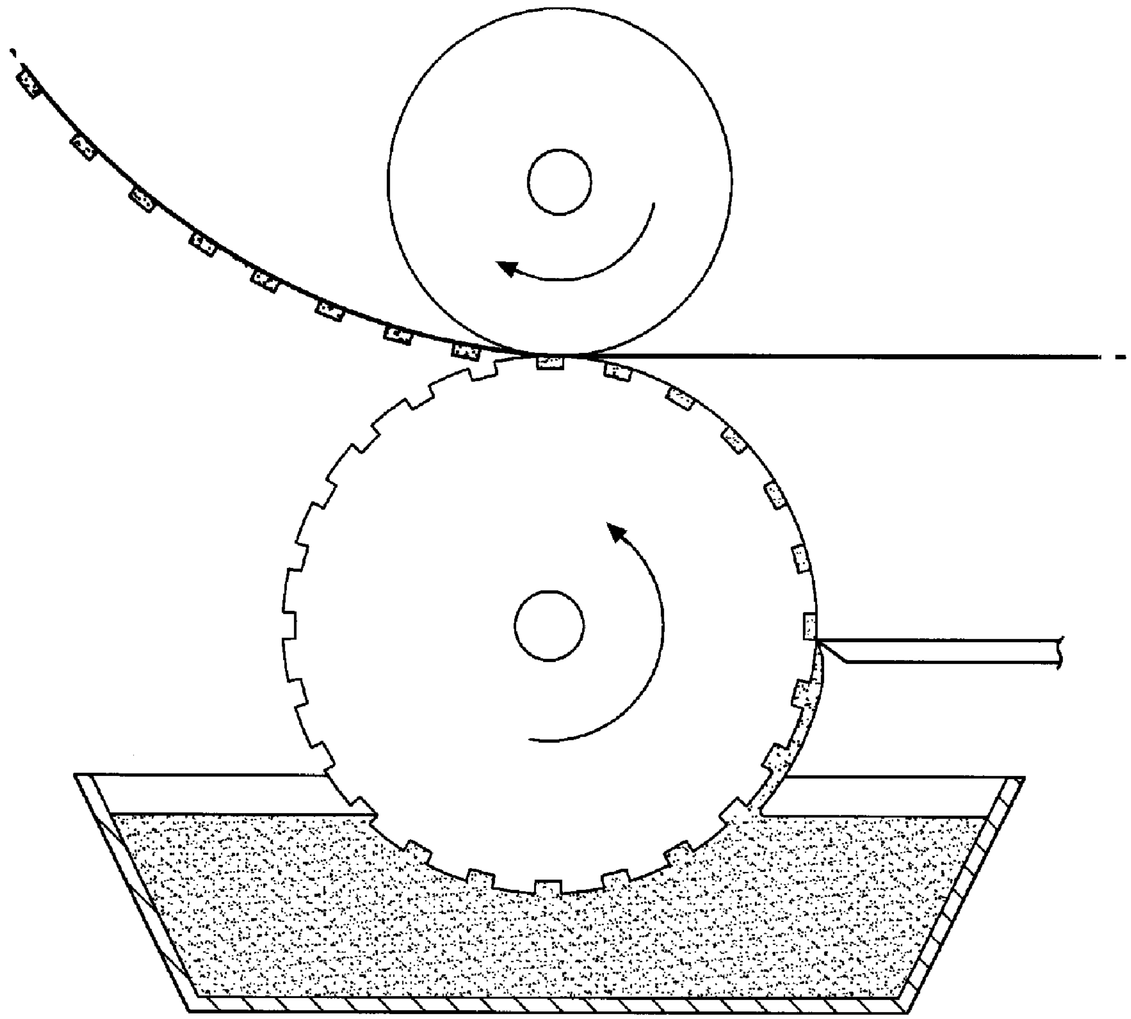

[Fig. 2]
(a)
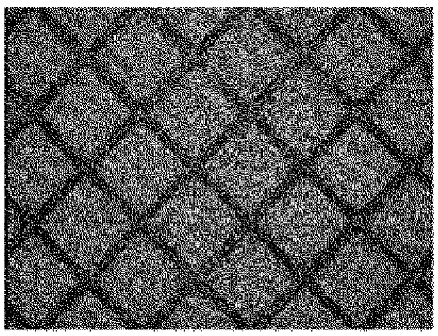
(b)
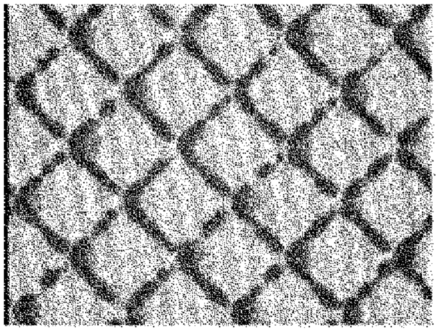

BI-LAYER STRUCTURED SHEET HAVING EXCELLENT PRINTABILITY WHEN PRINTED BY HARD ROLL AND METHOD FOR PRODUCING THE SAME

This application is an application based on International Patent Application No. PCT/KR2007/005111 filed Oct. 18, 2007, which claims the benefit of Korean Application No. 10-2006-0102130 filed Oct. 20, 2006, which are hereby incorporated by reference for all purposes as if fully set forth herein.

TECHNICAL FIELD

The present invention relates to a bi-layer structured sheet having excellent printability when printed by hard roll and a method for producing the same, and more particularly, to a sheet having a silicon/plastic bi-layer structure capable of easily transferring a paste even when a hard roll is used, the hard roll having excellent durability but having advantages that the paste is poorly transferred when the paste is printed on a plastic base, and a method for producing the same.

BACKGROUND ART

Recently, various display devices such as televisions, computer monitors and the like have been manufactured in the form of flat panel displays, such as LCD, PDP and the like, other than the form of conventional cathode-ray tubes (CRT). There are many cases that, owing to various reasons, micro patterns of conductive materials are formed on a surface of such a flat panel display. For example, a surface of a film may be coated with conductive materials in a network-type pattern to shield electromagnetic waves, or a film having a stripe pattern may be formed on a front substrate or a rear substrate of PDP.

An operation of coating a film with a pattern of conductive materials should be necessarily carried out to form these patterns on the film, and one of the processes widely used in the coating operation is a photolithographic process. The photolithographic process is to form a desired pattern on a film by forming a conductive material on the entire surface of the film, applying a photosensitive material on the conductive material, exposing the photosensitive materials to the UV light (exposure) to correspond to a region to be removed or a remainder region, depending on the use of a negative or positive mode, removing the UV-exposed material or the remainder region and etching a region from which the remainder region is removed.

The use of this photolithographic process is desirable since it is possible to form highly fine patterns, but it has disadvantages that it is complicated, the loss of expensive materials are high since the materials are applied to the other region other than a region to be patterned, and a lot of the cost is required to treat liquid waste generated during the development and etching processes. Also, when the exposure, development and etching equipment used in the photolithographic process is manufactured in a large scale, its manufacturing cost is also high, which is a big obstacle to catch up with a recent trend of a large display screen.

Accordingly, printing processes that use inexpensive equipment and have low material waste and no liquid waste have been increasingly in the limelight. Among them, the most widely used printing processes include a screen printing process, an off-set printing process, and a roll printing process such as a soft roll or hard roll printing of a gravure printing process.

Among them, the screen printing process is a process of forming a pattern by putting a screen engraved with a desired printing pattern on each of films and applying a paste to the film using a roll, etc., but it has a problem that its productivity is extremely low since the pastes is printed on the films one by one.

The off-set printing process is a process of forming a pattern by applying a paste to a hard roll plate that is engraved with a certain pattern and made of glass or metals, filling a groove region of the pattern with the paste using a doctor blade, pressing a soft roll (so-called a blanket), which is composed of silicon rubber and the like, on the hard roll plate to primarily transfer the pattern to the hard roll plate, and pressing the soft roll on a substrate and rolling the soft roll to secondarily transfer the pattern to the substrate.

Also, the soft roll printing process of the gravure printing process is a process of dipping some part of a soft printing roll, which has a groove concavely engraved for printing and is made of materials such as silicon rubber and the like, in a container containing an ink (herein, a paste), or soaking a surface of the roll in a paste in another process, for example, in a process of supplying a paste from the top, removing the ink, which is attached to a region rather than the concave groove, with a doctor blade so that the ink can remain in the concave groove, passing a film between the printing roll and a metallic backup roll facing the printing roll to transfer the remaining paste in the concave groove of the printing roll to the film.

The above-mentioned soft-roll printing process has an advantage that its printability is excellent due to the releasing property and rubber properties in a silicon surface, but joints are inevitably formed in the roll since a soft sheet is processed into a roll shape, and therefore it is impossible to form a desire pattern in the joint region. As a result, defects may occur in the joint region of a sheet when the sheet is rolled at least one time to transfer a pattern to the sheet. Therefore, a roll should be rolled at least one time when a printing process is carried out using a soft roll having the joint region, and therefore length of a region to be printed should be limited to a length range that is less than the circumference of a printing roll. Furthermore, a roll should be changed in size according to the final standard requirements, for example increasing a diameter of a printing roll to print a pattern in a large area, and therefore the equipment used in the soft-roll printing process should be modified and manufactured in a large scale.

In addition, the use of a soft roll such as silicon rubber results in swelling a silicon roll due to the presence of organic solvents mixed in a paste. As a result, when the printing process is repeated several hundred or more times, the silicon roll may be deformed by the swelling of the silicon roll, which leads to the deteriorated pattern accuracy.

As described above, an alternative to the soft roll printing method may be a hard roll printing method where a pattern is printed using a hard roll made of metal, especially stainless steel other than the soft roll made of silicon rubber. There in no limitation on the size of a region to be printed since the hard roll may be manufactured in the perfect shape of cylinder without any of joints, and thus it is possible to solve the problem regarding that rolls of various sizes are prepared according to the size of a region to be printed. Also, the prepared sheet has excellent durability since a roll is not swell by the organic solvents in the paste.

However, when the substrate on which a pattern is printed is so hard (e.g., a glass substrate), the hard roll has a poor releasing property and low rubber characteristics. Therefore, the hard roll has problems that it is impossible to transfer a pattern to the hard substrate, and only the materials such as plastic film are used as the substrate. Polyethylene terephthalate (PET) is widely used as the plastic film, but it has disadvantages that a paste is not suitably transferred from a hard roll since PET has a relatively high surface hardness.

DISCLOSURE OF INVENTION

Technical Problem

An aspect of the present invention provides a sheet having excellent printability capable of desirably transferring a paste to the sheet when the paste is printed by a hard roll made of metals, and a method for producing the same.

Technical Solution

According to an aspect of the present invention, there is provided a bi-layer structured sheet having printability when printed by a hard roll, the sheet including a flexible substrate and a silicon resin formed on the substrate.

In this case, the silicon resin may be formed by applying a silicon resin composition onto the substrate and curing the silicon resin composition, the composition including (a) alkenyl group-containing polyorganosiloxane; (b) polyorganosiloxane containing SiH group so that a molar ratio of the SiH to alkenyl of the alkenyl group-containing polyorganosiloxane is in a range from 0.5 to 20; (c) a platinum group compound that is present in a content of 1 to 5,000 ppm based on the sum of the weight of the alkenyl group-containing polyorganosiloxane (a) and the SiH group-containing polyorganosiloxane (b); and (d) an organic solvent.

In particular, the alkenyl group-containing polyorganosiloxane may have a structure represented by the following Formula 1 or 2:

$$R^1_{(3-a)}X_aSiO—(R^1XSiO)_m—(R^1_2SiO)_n—SiR^1_{(3-a)}X_a \quad \text{Formula 1}$$

$$R^1_2(HO)SiO—(R^1XSiO)_p—(R^1_2SiO)_q—SiR^1_2(OH) \quad \text{Formula 2}$$

wherein, $R^1$ is a monovalent hydrocarbon group that is free from an aliphatic unsaturated bond, X is an alkenyl group-containing organic group, a is integer ranging from 0 to 3, m and p are numbers ranging from 0 to 5,000, provided that a and m may not be 0 together, n or q is integer ranging from 100 to 10,000.

And, the 'a' may be 1.

Also, the $R^1$ may have carbon atoms of 1 to 10.

Furthermore, the $R^1$ may be selected from the group consisting of alkyl groups such as methyl, ethyl, propyl, butyl, and the like, cyclo alkyl groups such as cyclo hexyl, and the like, aryl groups such as phenyl, tollyl, and the like.

And, the X may have carbon atoms of 2 to 20.

Also, the X may be selected from the group consisting of vinyl, allyl, hexenyl, octenyl, acryloyl propyl, acryloyl methyl, methacryloyl propyl, cyclohexenylethyl, vinyloxy propyl groups.

Furthermore, the SiH group-containing polyorganosiloxane may be one or a mixture of at least two selected from the group consisting of linear, branched or cyclic organohydrogenpolysiloxanes having at least two bound hydrogen atoms in molecules.

Also, the organohydrogenpolysiloxane may have a structure represented by the following Formula 3 or 4:

$$H_bR^1_{3-b}SiO—(HR^1SiO)_x—(R^1_2SiO)_y—SiR^1_{3-b}H_b \quad \text{Formula 3}$$

$$—(HR^1SiO)_s—(R^1SiO)_t— \quad \text{Formula 4}$$

wherein, b is integer of 0 or 1, x and y are integers, provided that 500=x=0, 1000=y=1, s is also integer of 2 or more, t is integer of 0 or more, provided that s and t satisfy the conditions: s+t=3, preferably 8=s+t=3.

Also, the organohydrogenpolysiloxane may have a viscosity of 1 to 5000 mPa·s at 25° C.

In addition, the platinum group compound may be at least one selected from the group consisting of platinum black, chloroplatinic acid, chloroplatinic acid-olefin complexes, chloroplatinic acid-alcohol coordination compounds, rhodium, and rhodium-olefin complexes.

Furthermore, the organic solvent may be one or two or more selected from the group consisting of toluene, xylene, ethyl acetate, acetone, methylethylketone and hexane.

And, the organic solvent may be present in a content of 10 to 1000 parts by weight, based on 100 parts by weight of the sum of the alkenyl group-containing poly-organosiloxane (a) and the SiH group-containing polyorganosiloxane (b).

Also, the silicon resin composition may further include one or two or more additives selected from the group consisting of non-reactive polyorganosiloxane selected from the group consisting of polydimethyl siloxane and polydimethyldiphenylsiloxane; an antioxidant selected from the group consisting of phenol, quinone, amine, phosphorus, phosphate, sulfur and thioether based antioxidants; a light stabilizer selected from the group consisting of triazole and benzophenone based light stabilizer; a flame retardant selected from the group consisting of phosphoric acid ester, halogen, phosphorus and antimony based flame retardant; an antistatic agent selected from the group consisting of a cationic surfactant, an anionic surfactant and a nonionic surfactant; an inorganic filler selected from the group consisting of a colorant, a reinforcing agent, a filler, a defoaming agent, a surfactant, a plasticizer and silica; and a pigment.

And, the additive may be present in a content of 20 or less parts by weight, based on 100 parts by weight of the sum of the alkenyl group-containing polyorganosiloxane (a) and the SiH group-containing polyorganosiloxane (b).

In addition, the silicon resin composition may further include one silane coupling agent or a mixture of two or more selected from the group consisting of γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane, and γ-acetoacetatepropyltrimethoxysilane.

Furthermore, the flexible substrate may be selected from the group consisting of a plastic film such as polyester, polytetrafluoroethylene, polyimide, polyphenylene sulfide, polyamide, polycarbonate, polystyrene, polypropylene, polyethylene, polyvinyl chloride, polyethersulfone (PES), and polyethylenenaphthalate (PEN); or a metal foil such as an aluminum foil and a copper foil.

Also, the flexible substrate may be subject to at least one treatment selected from the group consisting of primer treatment, corona treatment, etching treatment, plasma treatment and heat treatment.

According to another aspect of the present invention, there is provided a method for producing a bi-layer structured sheet having excellent printability when printed by hard roll, the method including: applying a silicon resin composition, intact or diluted with an organic solvent, onto a flexible substrate; and curing the silicon resin composition applied onto the flexible substrate, wherein the silicon resin composition includes (a) alkenyl group-containing polyorganosiloxane; (b) polyorganosiloxane containing SiH group so that a molar ratio of the SiH to alkenyl of the alkenyl group-containing poly-organosiloxane is in a range from 0.5 to 20; (c) a platinum group compound that is present in a content of 1 to 5,000 ppm based on the sum of the weight of the alkenyl group-containing polyorganosiloxane (a) and the SiH group-containing poly-organosiloxane (b); and (d) an organic solvent.

And, the silicon resin composition may be applied onto the flexible substrate in a content range of 0.1 to 200 g/$m^2$ on the basis of the solid contents of the composition.

Also, before the applying of the silicon resin composition onto the flexible substrate, the flexible substrate may be pre-treated by at least one method selected from primer treatment, corona treatment, etching treatment, plasma treatment and heat treatment.

Furthermore, the curing of the silicon resin composition may be carried out by heating the silicon resin composition at 80 to 250° C. for 10 to 300 seconds.

Advantageous Effects

The sheet having excellent printability when printed by a hard roll according to the present invention, and the method for producing the same may be useful to desirably transfer a paste to the sheet when the paste is printed by a metallic hard roll.

BRIEF DESCRIPTION OF THE DRAWINGS

FIG. 1 is a side cross-sectional view schematically illustrating a gravure printing process which is one of roll printing processes.

FIG. 2 is a photographic diagram illustrating printed patterns when a paste is printed on a surface of a sheet having a bi-layer structure of a silicon/a flexible substrate according to one exemplary embodiment of the present invention (a) and a paste is printed on a surface of a PET film as a comparative example (b).

BEST MODE FOR CARRYING OUT THE INVENTION

Hereinafter, exemplary embodiments of the present invention will be described in detail.

The present inventors have ardently attempted to solve the problem regarding a substrate on which a paste is printed by a conventional hard roll, and therefore found that, since the conventional printing substrate has problems that a surface of the hard roll has a high surface hardness although its surface hardness is not high as in rigid materials such as glass, it's adhesive property to paste or deformation capacity are not sufficient to release a paste from the hard roll with strongly attached to the paste filled in an engraved pattern of the hard roll since it's surface hardness is still relatively high.

Accordingly, the present inventors have found that a paste is easily transferred to the bi-layer structured sheet, and effectively printed using a hard roll when a bi-layer structured sheet in which a soft silicon resin thin film is further formed on a flexible substrate is used as a substrate, and therefore the present invention has been completed on the basis of the above facts.

As described above, the bi-layer structured sheet according to the present invention has a configuration where a silicon resin is formed on a flexible substrate as a thin film.

The silicon resin forms a soft surface layer that functions to decrease a surface hardness of a substrate and make the substrate permeate into a surface of a rigid metallic hard roll to facilitate the contact with a paste.

However, a thickness of the silicon resin is preferably in a range from 1 to 200 μm, considering that the sheet according to the present invention is processed into a film that will later be attached to a display device. When the thickness of the silicon resin is less 1 μm, the silicon resin has an insufficient ability to facilitate the transfer of a paste when it is used to form a soft surface layer, whereas a printed pattern is poor when the thickness of the silicon resin exceeds 200 μm.

In order to meet the above objects, the silicon resin is preferably prepared by applying a composition including the following preferred components onto a substrate and drying the composition.

Preferable components of a composition for preparing a silicon resin (hereinafter, referred to as a silicon resin composition)

(a) alkenyl group-containing polyorganosiloxane;

(b) polyorganosiloxane containing SiH group: A molar ratio of the SiH to alkenyl of the alkenyl group-containing polyorganosiloxane is in a range from 0.5 to 20;

(c) a platinum group compound: the compound is present in a content of 1 to 5,000 ppm based on the sum of the weight of the alkenyl group-containing poly-organosiloxane (a) and the SiH group-containing polyorganosiloxane (b); and (d) an organic solvent: the solvent is present in a content of 10 to 1000 parts by weight based on 100 parts by weight of the sum of the alkenyl group-containing poly-organosiloxane (a) and the SiH group-containing polyorganosiloxane (b).

Hereinafter; each of the components of the composition will be described in detail, as follows.

(a) Alkenyl Group-Containing Polyorganosiloxane

The alkenyl group-containing polyorganosiloxane is an important component to form a silicon resin, and has a structure represented by the following Formula 1 or 2.

$$R^1_{(3-a)}X_aSiO—(R^1XSiO)_m—(R^1_2SiO)_n—SiR^1_{(3-a)}X_a \quad \text{Formula 1}$$

$$R^1_2(HO)SiO—(R^1XSiO)_p—(R^1_2SiO)_q—SiR^1_2(OH) \quad \text{Formula 2}$$

In the Formulas 1 and 2, $R^1$ is a monovalent hydrocarbon group that is free from an aliphatic unsaturated bond, X is an alkenyl group-containing organic group, a is integer ranging from 0 to 3, m and p are numbers ranging from 0 to 5,000, provided that a and m may not be 0 together, n or q is integer ranging from 100 to 10,000.

In particularly, the $R^1$ more preferably has carbon atoms of 1 to 10, and preferred examples of the $R^1$ include alkyl groups such as methyl, ethyl, propyl, butyl, and the like, cyclo alkyl groups such as cyclo hexyl, and the like, aryl groups such as phenyl, tollyl, and the like. Among them, a methyl group and a phenyl group are particularly preferred.

The X, which is an alkenyl group-containing organic group, preferably has carbon atoms of 2 to 20, and preferred examples of the X include vinyl, allyl, hexenyl, octenyl, acryloyl propyl, acryloyl methyl, methacryloyl propyl, cyclohexenylethyl, vinyloxy propyl groups, etc.

(b) SiH Group-Containing Polyorganosiloxane

The SiH group-containing polyorganosiloxane functions as a crosslinking agent in the composition, and linear, branched or cyclic organohydrogenpolysiloxanes having at least two, and preferably three or more bound hydrogen atoms in molecules may be used as the SiH group-containing polyorganosiloxane. Examples of the organohydrogenpolysiloxane include, but are not particularly limited to, compounds having structure represented by the following Formula 3 or 4.

$$H_bR^1_{3-b}SiO—(HR^1SiO)_x—(R^1_2SiO)_y—SiR^1_{3-b}H_b \quad \text{Formula 3}$$

$$—(HR^1SiO)_s—(R^1SiO)_t— \quad \text{Formula 4}$$

In the Formula 3 or 4, b is integer of 0 or 1, x and y are integers, provided that 500=x=0, 1000=y=1, s is also integer of 2 or more, t is integer of 0 or more, provided that s and t satisfy the conditions: s+t=3, preferably 8=s+t=3.

The organohydrogenpolysiloxane preferably has a viscosity of 1 to 5000 mPa·s at 25° C. Also, the organohydrogenpolysiloxane may be used alone or in combinations of two or more. When the viscosity of the organohydrogenpolysiloxane is extremely high, it is difficult to uniformly apply the composition to a flexible substrate, whereas it is difficult to ensure a uniform and sufficient thickness due to the deteriorated coating property when the viscosity of the organohydrogenpolysiloxane is extremely low.

The used SiH group-containing polyorganosiloxane (b) is desirably mixed with the alkenyl group-containing polyorganosiloxane (a) so that a molar ratio of the SiH in the alkenyl group-containing polyorganosiloxane (a) to the alkenyl group in the alkenyl group-containing polyorganosiloxane (a) can be in a range from 0.5 to 20, and preferably a range from 1 to 15. When the molar ratio is less than 0.5, it is difficult to maintain the shape of a sheet due to the low crosslinking density when the sheet is in contact with the organic solvent, whereas a sheet is too hardened due to the high crosslinking density, and thus wetness of the paste is deteriorated when the molar ratio exceeds 20.

(c) Platinum Group Compound

The platinum group compound is added to cure the silicon resin composition, and also functions as a catalyst that facilitates a so-called addition reaction between an alkenyl group-containing polyorganosiloxane (a) compound and an SiH group-containing polyorganosiloxane (b) compound. The catalyst used for the addition reaction, for example, includes platinum black, chloroplatinic acid, chloroplatinic acid-olefin complexes, chloroplatinic acid-alcohol coordination compounds, rhodium, rhodium-olefin complexes, etc. The catalyst for an addition reaction is preferably mixed in a content of 1 to 5000 ppm, and more preferably 5 to 2000 ppm, based on the metal weight of the sum of the alkenyl group-containing polyorganosiloxane (a) and the SiH group-containing polyorganosiloxane (b). When the content of the catalyst is less than 1 ppm, the curing property and crosslinking density of the composition are deteriorated, thereby making it difficult to maintain the shape of a sheet. On the contrary, a pot life is too short due to the increase in the reactivity or curing rate of the composition when the content of the catalyst exceeds 5000 ppm.

(d) Organic Solvent

The composition of the present invention may include an organic solvent to adjust coating properties and viscosity of the silicon resin. Solvents, such as toluene, xylene, ethyl acetate, acetone, methylethylketone, hexane and the like, that can homogeneously dissolve the composition of the present invention is preferably used as the organic solvent, and they may be used alone or in combinations thereof. In particular, toluene and xylene are preferred. The organic solvent is present in a content of 10 to 1000 parts by weight, based of 100 parts by weight of the sum of the alkenyl group-containing polyorganosiloxane (a) and the SiH group-containing polyorganosiloxane (b).

Other Components

In addition to the essential components, other components may be added to the silicon resin composition used in the present invention, if necessary.

For example, the silicon resin composition may further include one or two or more additives selected from the group consisting of non-reactive polyorganosiloxane selected from the group consisting of polydimethyl siloxane and poly-dimethyldiphenylsiloxane; an antioxidant selected from the group consisting of phenol, quinone, amine, phosphorus, phosphate, sulfur and thioether based antioxidants; a light stabilizer selected from the group consisting of triazole and benzophenone based light stabilizer; a flame retardant selected from the group consisting of phosphoric acid ester, halogen, phosphorus and antimony based flame retardant; an antistatic agent selected from the group consisting of a cationic surfactant, an anionic surfactant and a nonionic surfactant; an inorganic filler selected from the group consisting of a colorant, a reinforcing agent, a filler, a defoaming agent, a surfactant, a plasticizer and silica; and a pigment.

The total amounts of the added components are preferably adjusted to 20 or less parts by weight, based on 100 parts by weight of the sum of the alkenyl group-containing polyorganosiloxane (a) and the SiH group-containing polyorganosiloxane (b). When the amount of any of the added components exceeds the above ranges, transparency of the silicon resin composition may be adversely affected due to the appearance of hazes, and physical properties of silicon polymers may also be deteriorated. The additives are components that are added when necessary, as described above, and therefore it is unnecessary to limit the lowest limit of the additives. However, the additives are preferably present in a content of 0.01 or more parts by weight so as to show their characteristics.

Also, a silane coupling agent may be added to the silicon resin composition used in the present invention. Examples of the silane coupling agent include γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane, γ-acetoacetatepropyltrimethoxysilane, etc., and they may be used alone or in combination thereof.

In this case, the total amount of the added silane coupling agent is preferably adjusted to 20 or less parts by weight, based on 100 parts by weight of the sum of the alkenyl group-containing polyorganosiloxane (a) and the SiH group-containing poly-organosiloxane (b). When the amount of the added silane coupling agent exceeds the above ranges, transparency of the silicon resin composition may be adversely affected due to the appearance of hazes, and physical properties of silicon polymers may also be deteriorated.

The above-mentioned silicon resin composition is preferably formed in the shape of a silicon resin film when it is applied onto a flexible substrate, and then cured. The flexible substrate constituting the bi-layer structured sheet according to the present invention, which may be used herein, includes plastic films such as polyester, polytetrafluoroethylene, polyimide, polyphenylene sulfide, polyamide, polycarbonate, polystyrene, polypropylene, polyethylene, polyvinyl chloride, polyethersulfone (PES), polyethylenenaphthalate (PEN), etc., and metal foils such as aluminum foil, copper foil, etc.

In this case, the flexible substrate that has been subject to the primer treatment, corona treatment, etching treatment, plasma treatment and heat treatment may be used to improve close adhesivity between the substrate and the silicon resin layer.

Hereinafter, one preferable method for producing a bi-layer structured sheet according to the present invention using the silicon resin composition having the above-mentioned advantageous characteristics will be described in detail.

The bi-layer structured sheet according to the present invention may be prepared by applying the above-mentioned silicon resin composition onto a flexible substrate, and curing the silicon resin composition applied onto the flexible substrate.

More particularly, the silicon resin composition of the present invention is applied onto the flexible substrate, directly or after it is diluted with suitable organic solvent by the known methods such as a bar coater, a roll coater, a reverse coater, a gravure coater, an air knife coater, etc.

In this case, the plastic films such as polyester, polytetrafluoroethylene, polyimide, polyphenylene sulfide, polyamide, polycarbonate, polystyrene, polypropylene, polyethylene, polyvinyl chloride, polyethersulfone (PES), polyethylenenaphthalate (PEN), etc., and the metal foils such as aluminum foil, copper foil, etc. may be used as the flexible substrate, as described above.

The primer treatment, corona treatment, etching treatment, plasma treatment, or heat treatment of the flexible substrate may be carried out prior to the applying of the resin to improve close adhesivity between the substrate and the silicon resin layer.

The amount of the silicon resin composition according to the present invention that is applied onto the flexible substrate may be varied according to the kinds of the materials of the substrate to be applied, but the amount of the silicon resin composition is preferably in a range of 0.1 to 200 $g/m^2$, based on the solid contents of the composition. Therefore, it is possible to adjust a thickness of the silicon resin layer to a thickness range of 1 to 200 μm after the curing of the composition.

Then, a silicon/flexible bi-layer structured substrate sheet having desired softness may be prepared by heating the flexible substrate coated with the silicon resin composition at 80 to 250° C. for 10 to 300 seconds to form a cured thin film on a surface of the composition. When the curing temperature is less than 80° C., a curing reaction of a platinum catalyst, for example curing a silicon adhesive, may not occur, whereas the substrate coated with the silicon resin composition may be damaged when the curing temperature exceeds 250° C. Also, when the heating time is less than 10 seconds, the silicon resin composition is not cured sufficiently, and therefore the resulting thin film does not function as a silicon film, and its weight is highly changed due to the presence of residual substance. When the heating time exceeds 300 seconds, a sheet having a bi-layer structure of silicon resin/flexible substrate has a low production rate.

MODE FOR THE INVENTION

Hereinafter, exemplary embodiments of the present invention will now be described in detail with reference to the accompanying drawings. However, it is considered that the description proposed herein is just a preferable example for the purpose of illustrations only, not intended to limit the scope of the invention, so it should be understood that other equivalents and modifications could be made thereto without departing from the spirit and scope of the invention.

"part(s)" described in the exemplary embodiments of the present invention is referred to part(s) by weight.

Preparation of Bi-Layer Structured Sheet

A composition including silicon resin composition, including alkenyl-group containing polydimethyl siloxane having a molecular chain terminus capped with a vinyl group and including a unit of 0.5 mol % methyl vinyl siloxane; $Me_3SiO-[MeHSiO]_{40}SiMe_3$ as a crosslinking agent; and a platinum catalyst was dissolved with content of 30% of by weight of the solid composition to prepare a silicon resin composition.

In consideration of the coating properties of the prepared silicon resin composition, the silicon resin composition was homogeneously diluted with toluene so that a concentration of the resin composition can be 20% by weight, and PET was coated as a flexible substrate with the diluted resin composition, dried at 140° C. for 3 minutes to obtain a bi-layer structured sheet in which a silicon resin layer with an area of $30\times25$ $cm^2$ and a thickness of 25 μm is stacked on the PET.

Evaluation of Coating Property

The bi-layer structured sheet prepared thus was tested for printability when printed by a hard roll made of stainless steel (Example). A silver paste was used as a paste to be printed, and a roll whose surface is engraved with a lattice pattern was used in a printing process.

For the purpose of comparison, a PET substrate used in the conventional printing by a hard roll was also roll-printed using the hard roll made of stainless steel used in the Example (Comparative example).

The printing results obtained in the Example and Comparative example were shown in FIG. 2. As seen from FIG. 2(*a*), it was revealed that, when the bi-layer structured sheet prepared in the Example of the present invention is printed by a hard roll, a pattern is uniformly formed and hardly disconnected or split in a surface of the bi-layer structured sheet. On the contrary, it was observed that many disconnected and partially split patterns are present in a surface of the PET in the case of Comparative example (FIG. 2(*b*)), indicating that the paste present in the engraved pattern of the hard roll is not completely transferred to the surface of the PET. From the above-mentioned results, it was revealed that the bi-layer structured sheet of the Example of the present invention has an excellent printing property, compared to that of the Comparative example.

Accordingly, it was revealed that the bi-layer structured sheet according to the present invention has advantageous effects in the Example.

The invention claimed is:

1. A bi-layer structured sheet comprising a flexible substrate and a silicon resin having a thickness in a range of 1 to 200 μm formed on the substrate, wherein the silicon resin is formed by applying a silicon resin composition onto the substrate and curing the silicon resin composition, the composition comprising:

(a) alkenyl group-containing polyorganosiloxane;

(b) polyorganosiloxane containing SiH group so that a molar ratio of the SiH to alkenyl of the alkenyl group-containing polyorganosiloxane is in a range from 0.5 to 20;

(c) a platinum group compound that is present in a content of 1 to 5,000 ppm based on the sum of the weight of the alkenyl group-containing poly-organosiloxane (a) and the SiH group-containing polyorganosiloxane (b); and (d) an organic solvent, wherein the silicon resin composition further comprises one silane coupling agent or a mixture of two or more silane coupling agents selected from the group consisting of γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane, and γ-acetoacetatepropyltrimethoxysilane.

2. The bi-layer structured sheet of claim 1, wherein the alkenyl group-containing polyorganosiloxane has a structure represented by the following chemical formula 1 or 2:

$$R^1_{(3-a)}X_aSiO—(R^1XSiO)_m—(R^1_2SiO)_n—SiR^1_{(3-a)}X_a \quad \text{Formula 1}$$

$$R^1_2(HO)SiO—(R^1XSiO)_p—(R^1_2SiO)_q—SiR^1_2(OH) \quad \text{Formula 2}$$

wherein, $R^1$ is a monovalent hydrocarbon group that is free from an aliphatic un-saturated bond, X is an alkenyl group-containing organic group, a is integer ranging from 0 to 3, m and p are numbers ranging from 0 to 5,000, provided that a and m may not be 0 together, n or q is integer ranging from 100 to 10,000.

3. The bi-layer structured sheet of claim 2, wherein the 'a' is 1.

4. The bi-layer structured sheet of claim 2, wherein the $R^1$ has carbon atoms of 1 to 10.

5. The bi-layer structured sheet of claim 4, wherein the $R^1$ is selected from the group consisting of a methyl group, an ethyl group, a propyl group, a butyl group, a cyclo hexyl group, a phenyl group, and a tollyl group.

6. The bi-layer structured sheet of claim 2, wherein the X has carbon atoms of 2 to 20.

7. The bi-layer structured sheet of claim 6, wherein the X is selected from the group consisting of a vinyl group, an allyl group, a hexenyl group, an octenyl group, an acryloyl propyl group, an acryloyl methyl group, a methacryloyl propyl group, a cyclohexenylethyl group, and a vinyloxy propyl group.

8. The bi-layer structured sheet of claim 1, wherein the SiH group-containing poly-organosiloxane is one or a mixture of at least two selected from the group consisting of linear, branched or cyclic organohydrogenpolysiloxanes having at least two bound hydrogen atoms in molecules.

9. The bi-layer structured sheet of claim 8, wherein the organohydrogenpolysiloxane has a structure represented by the following chemical formula 3 or 4:

$$H_bR^1_{3-b}SiO—(HR^1SiO)_x—(R^1_2SiO)_y—SiR^1_{3-b}H_b \quad \text{Formula 3}$$

$$—(HR^1SiO)_s—(R^1SiO)_t— \quad \text{Formula 4}$$

wherein, b is integer of 0 or 1, x and y are integers, provided that $500 \geqq x \geqq 0$, $1000 \geqq y \geqq 1$, s is also integer of 2 or more, t is integer of 0 or more, provided that s and t satisfy the conditions: $8 \geqq s+t \geqq 3$.

10. The bi-layer structured sheet of claim 9, wherein the organohydrogenpolysiloxane has a viscosity of 1 to 5000 mPa·s at 25° C.

11. The bi-layer structured sheet of claim 1, wherein the platinum group compound is at least one selected from the group consisting of platinum black, chloroplatinic acid, chloroplatinic acid-olefin complexes, and chloroplatinic acid-alcohol coordination compounds.

12. The bi-layer structured sheet of claim 1, wherein the organic solvent is one or two or more selected from the group consisting of toluene, xylene, ethyl acetate, acetone, methylethylketone and hexane.

13. The bi-layer structured sheet of claim 12, wherein the organic solvent is present in a content of 10 to 1000 parts by weight, based on 100 parts by weight of the sum of the alkenyl group-containing polyorganosiloxane (a) and the SiH group-containing polyorganosiloxane (b).

14. The bi-layer structured sheet of claim 1, wherein the silicon resin composition further comprises one or two or more additives selected from the group consisting of non-reactive polyorganosiloxane selected from the group consisting of polydimethyl siloxane and polydimethyldiphenylsiloxane; an antioxidant selected from the group consisting of a phenol-based antioxidant, a quinone-based antioxidant, an amine-based antioxidant, a phosphorous-based antioxidant, a phosphate-based antioxidant, a sulfur-based antioxidant, and a thioether-based antioxidant; a light stabilizer selected from the group consisting of triazole and benzophenone based light stabilizer; a flame retardant selected from the group consisting of a phosphoric acid ester-based flame retardant, a halogen-based flame retardant, a phosphorous-based flame retardant, and an antimony-based flame retardant; an antistatic agent selected from the group consisting of a cationic surfactant, an anionic surfactant and a nonionic surfactant; and a pigment.

15. The bi-layer structured sheet of claim 14, wherein the additive is present in a content of 20 or less parts by weight, based on 100 parts by weight of the sum of the alkenyl group-containing polyorganosiloxane (a) and the SiH group-containing polyorganosiloxane (b).

16. The bi-layer structured sheet of claim 1, wherein the flexible substrate is selected from the group consisting of a plastic film such as polyester, polytetrafluoroethylene, polyimide, polyphenylene sulfide, polyamide, polycarbonate, polystyrene, polypropylene, polyethylene, polyvinyl chloride, polyethersulfone (PES), and polyethylenenaphthalate (PEN); or a metal foil such as an aluminum foil and a copper foil.

17. The bi-layer structured sheet of claim 16, wherein the flexible substrate is subject to at least one treatment selected from the group consisting of primer treatment, corona treatment, etching treatment, plasma treatment and heat treatment.

18. A method for producing a bi-layer structured sheet, the method comprising:

pre-treating a flexible substrate with at least one method selected from a primer treatment, a corona treatment, an etching treatment, a plasma treatment, and a heat treatment;

applying a silicon resin composition, intact or diluted with an organic solvent, to the flexible substrate in a content range of 0.1 to 200 $g/m^2$ on the basis of the solid contents of the composition; and curing the silicon resin composition applied onto the flexible substrate at 80 to 250° C. for 10 to 300 seconds, wherein the silicon resin composition comprises:

(a) an alkenyl group-containing polyorganosiloxane;

(b) polyorganosiloxane containing a SiH group such that a molar ratio of the SiH to alkenyl of the alkenyl group-containing polyorganosiloxane is in a range from 0.5 to 20;

(c) a platinum group compound that is present in a content of 1 to 5,000 ppm based on the sum of the weight of the alkenyl group-containing polyorganosiloxane (a) and the SiH group-containing polyorganosiloxane (b); and (d) an organic solvent.

* * * * *